(12) United States Patent
Yen

(10) Patent No.: US 8,625,009 B2
(45) Date of Patent: Jan. 7, 2014

(54) ELECTRONIC DEVICE HAVING ONE IMAGE SENSOR AND TWO LENS MODULES

(75) Inventor: Shih-Chieh Yen, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 296 days.

(21) Appl. No.: 13/226,460

(22) Filed: Sep. 6, 2011

(65) Prior Publication Data

US 2013/0002913 A1    Jan. 3, 2013

(51) Int. Cl.
*H04N 5/225* (2006.01)
*H04N 5/232* (2006.01)

(52) U.S. Cl.
USPC .......................... 348/262; 348/347; 348/360

(58) Field of Classification Search
USPC .......................................... 348/262, 347, 360
See application file for complete search history.

(56) References Cited

U.S. PATENT DOCUMENTS

2008/0088732 A1* 4/2008 Lin ............................... 348/347
2011/0274422 A1* 11/2011 Lin ............................... 396/439

* cited by examiner

*Primary Examiner* — Twyler Haskins
*Assistant Examiner* — Quang Le
(74) *Attorney, Agent, or Firm* — Altis Law Group, Inc.

(57) ABSTRACT

An electronic device includes a main body and an image capturing device positioned on the main body. The image capturing device includes a fixing pole, a rotating plate, two lens modules, and an image sensor. The fixing pole is fixed on the main body. The rotating plate is sleeved over the fixing pole and rotates around the fixing pole. The two lens modules are mounted on the rotating plate and symmetrical with the fixing pole. The image sensor is arranged on the main body. The rotating plate is rotated to make the two lens modules be alternated to align with the image sensor.

7 Claims, 3 Drawing Sheets

ELECTRONIC DEVICE HAVING ONE IMAGE SENSOR AND TWO LENS MODULES

BACKGROUND

1. Technical Field

The present disclosure relates to electronic devices and, particularly, to an electronic device having one image sensor and two lens modules.

2. Description of Related Art

Most electronic devices (e.g. computers and mobile phones) have an image capturing function. Some electronic devices have more than one camera module for capturing images having different resolutions, and each camera module includes a lens module and an image sensor. The image sensor is expensive. Therefore, the cost of the electronic device is increased.

Therefore, it is desirable to provide an electronic device that can overcome the above-mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
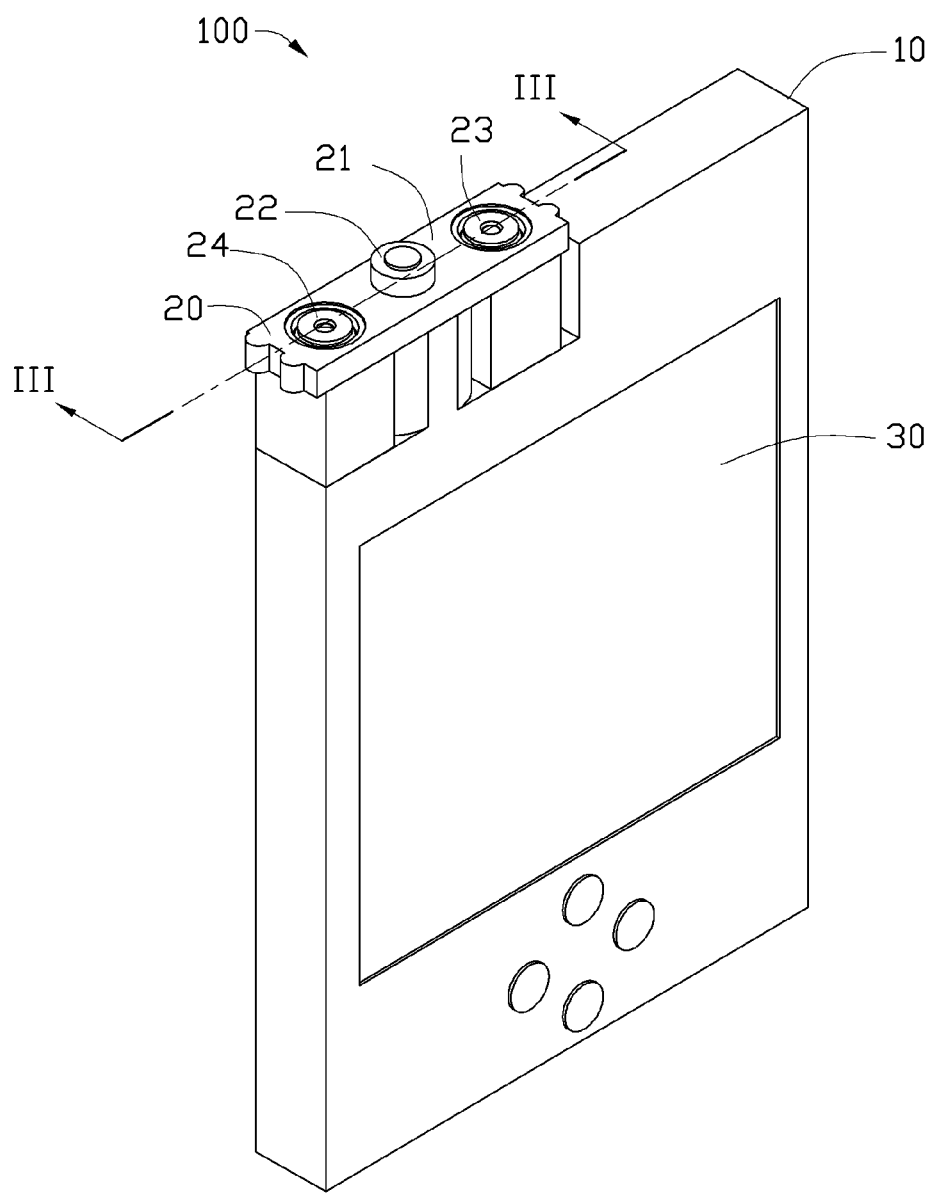
FIG. 1 is an isometric view of an electronic device, according to an exemplary embodiment.
Figure 2:
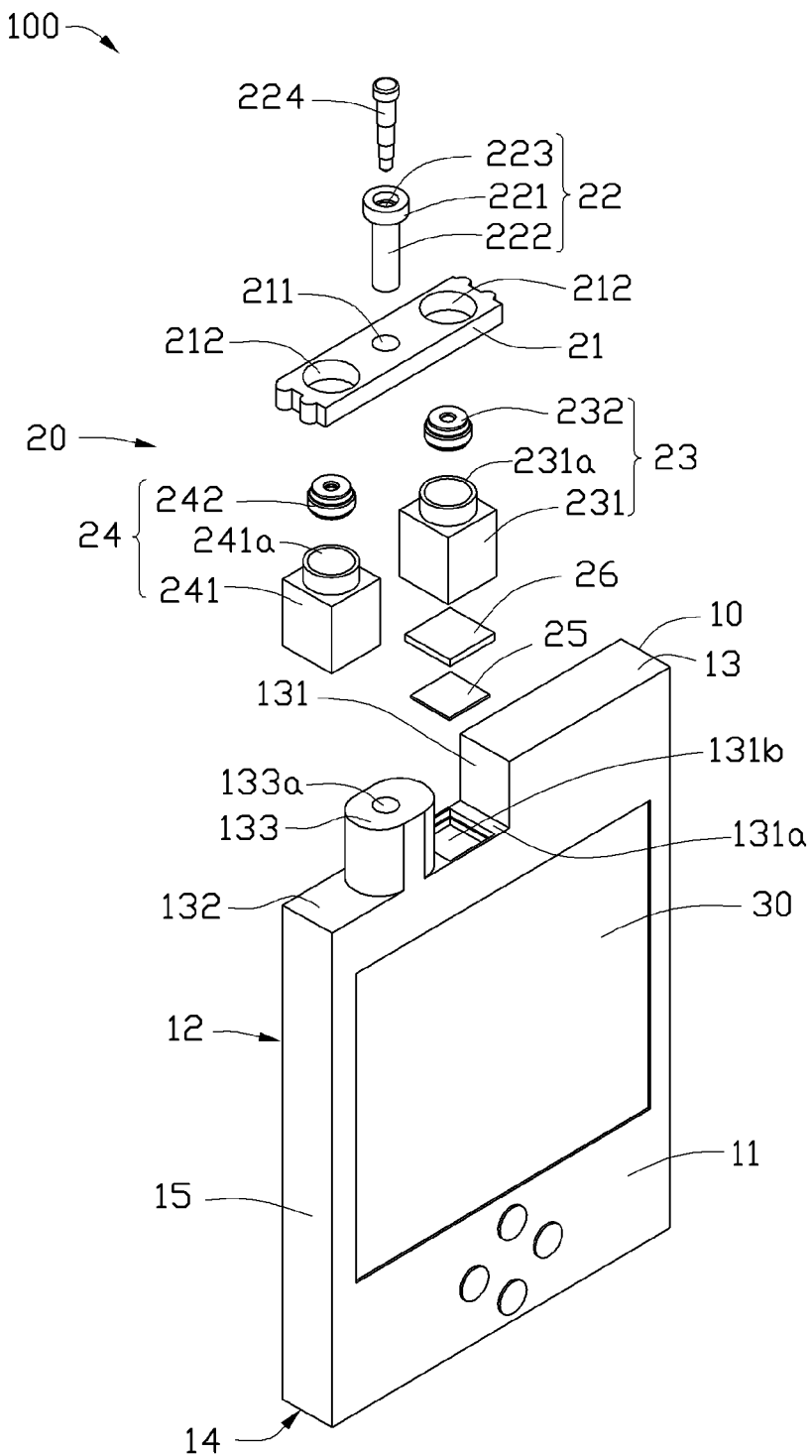
FIG. 2 is an exploded view of the electronic device of FIG. 1
Figure 3:
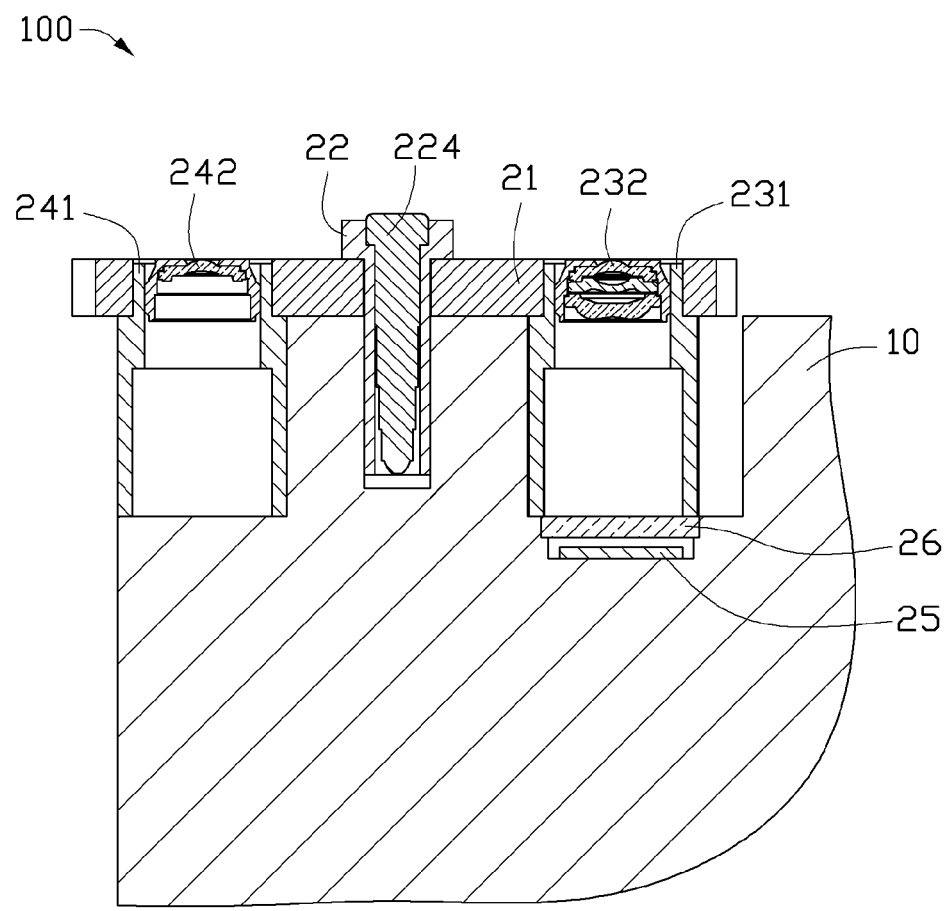
FIG. 3 is a cross-sectional view taken along a line III-III of the electronic device of FIG. 1.

Referring to FIGS. 1 to 3, an electronic device 100, according to an embodiment, includes a main body 10 and an image capturing device 20. The electronic device 100 may be a mobile phone, a PDA, a computer, or the like. In this embodiment, the electronic device 100 is a mobile phone.

The main body 10 is substantially cuboid, and includes a front surface 11, a rear surface 12, a top surface 13 and a bottom surface 14, and two side surfaces 15. The two side surfaces 15 connect the front surface 11, the rear surface 12, the top surface 13, and the bottom surface 14. A display 30 is arranged on the front surface 11.

In this embodiment, the image capturing device 20 is arranged above and to the left of the display 30. The top surface 13 defines a first cutout 131 and a second cutout 132 to accommodate the image capturing device 20. Each of the first cutout 131 and the second cutout 132 includes a base surface 131a parallel to the top surface 13. A protrusion 133 is formed between the first cutout 131 and the second cutout 132. The protrusion 133 defines a blind hole 133a perpendicular to the base surface 131a.

The image capturing device 20 includes a rotating plate 21, a fixing pole 22, a first lens module 23, a second lens module 24, and an image sensor 25.

The rotating plate 21 defines a through hole 211 and two mounting holes 212. The two mounting holes 212 are symmetrically arranged on opposite sides of the through hole 211. The center of the through hole 211 and the centers of the two mounting holes 212 are on one straight line.

The fixing pole 22 is substantially a hollow cylinder, and includes a first portion 221 and a second portion 222 extending from the first portion 221. The diameter of the first portion 221 is larger than that of the second portion 222 and the through hole 211. The diameter of the second portion 222 is slightly smaller than that of the through hole 211, and thus the rotating plate 21 can rotate in the second portion 222. The second portion 222 extends through the through hole 211 to be inserted in the blind hole 133a, and thus the fixing pole 22 is fixed on the main body 10. In this embodiment, the blind hole 133a is substantially cylindrical, and the fixing pole 22 is screwed into the blind hole 133a. In other embodiments, the fixing pole 22 is an interference fit in the blind hole 133a. Other manners of fixing can also be used.

The fixing pole 22 defines a receiving groove 223 for receiving other accessories 224 (such as a stylus), and thus the configuration of the electronic device 100 can be more compact.

The first lens module 23 and the second lens module 24 are respectively fixed on or to the two mounting holes 212, so as to be fixed on the rotating plate 21. The first lens module 23 includes a barrel 231 and a first lens unit 232 received in the first barrel 231. The second lens module 24 includes a second barrel 241 and a second lens module 242 received in the second barrel 241. In this embodiment, the first barrel 231 includes a hollow cylindrical first fixing portion 231a. The second barrel 241 includes a hollow cylindrical second fixing portion 241a. The first lens unit 232 is mounted in the first fixing portion 231a, and the external diameter of the first fixing portion 231a is slightly smaller than the internal diameter of the mounting hole 212. The second lens unit 242 is mounted in the second fixing portion 241a, and the external diameter of the second fixing portion 241a is slightly smaller than the internal diameter of the mounting hole 212. In other embodiments, glue or some other fixative method may be used to secure the first lens module 23 and the second lens module 24 to the rotating plate 21. The protrusion 133 is substantially oval in cross section, to facilitate the rotation of the plate 21, and to ensure the correct orientation in use of the first lens module 23 and the second lens module 24.

The image sensor 25 is arranged on or in the base surface 131a or the second cutout 132. The base surface 131a defines a receiving groove 131b. In the illustrated embodiment, the receiving groove 131b is a square, stepped depression. The image sensor 25 is arranged on the bottom of the receiving groove 131b, and a glass plate 26 covers and seals the image sensor 25. The image sensor 25 can be a CCD (Charge Coupled Device) or a CMOS (Complementary Metal Oxide Semiconductor).

The first lens module 23 has a large aperture which allows more light to pass through. Therefore, a greater number of the image pixels of the image sensor 25 can be activated to form a first image having a higher resolution. The second lens module 24 has a smaller aperture which allows less light to pass through, therefore a smaller number of the image pixels of the image sensor 25 can be activated to form a second image having a lower resolution. Thus, by aligning one or other of the lens modules with the image sensor 25, images of the same object or scene but with different resolutions can be captured.

In use, if a user wants a high resolution image, he/she can rotate the rotating plate 21 to align the first lens module 23 with the image sensor 25 and then capture the image with the electronic device 100. If the user wants to capture a lower resolution image, he/she can rotate the rotating plate 21 to align the second lens module 24 with the image sensor 25 and capture the image with the electronic device 100. The mounting of the first lens module 23 and the second lens module 24 will be secure and the precise orientation of each lens module will be maintained at all points during the rotation and after any rotation of the plate 21.

The electronic device 100 having two interchangeable lens modules 23, 24 and one image sensor 25, the two lens modules can be alternated as desired and the omission of an image sensor with respect to the current electronic device will reduce the cost of the electronic device 100.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A electronic device, comprising:
   a main body comprising a front surface carrying a display, a rear surface opposite to the front surface, a top surface connecting the front surface and the rear surface, a bottom surface opposite to the top surface, and two side surfaces, each of the two side surface connects the front surface, the rear surface, the top surface and the bottom surface, wherein the top surface defines a first cutout and a second cutout, each of which comprises a base surface parallel to the top surface;
   an image capturing device positioned on the main body, comprising:
      a fixing pole fixed on the main body;
      a rotating plate sleeved over the fixing pole and capable of rotating around the fixing pole;
      two lens module mounted on the rotating plate and symmetrical with the fixing pole, wherein the two lens module comprises a first lens module and a second lens module, the first lens module comprises a first barrel and a first lens unit received in the first barrel, the second lens module comprises a second barrel and a second lens unit received in the second barrel, the first lens module has a bigger aperture which allows more amount of light to pass therethrough, and thus more image pixels of the image sensor is able to be activated to form a first image having a higher resolution, the second lens module has a smaller aperture which allows less amount of light to pass therethrough, and thus less image pixels of the image sensor is able to be activated to form a second image having a lower resolution; and
      an image sensor arranged on the base surface of one of the first cutout and the second cutout, wherein the base surface carrying the image sensor defines a stepped depression, the image sensor is arranged in the stepped depression; and
      a glass plate covering the image sensor;
   wherein the rotating plate is capable of being rotated to make the two lens modules be alternated to align with the image sensor.

2. The electronic device of claim 1, wherein the main body comprises a protrusion positioned between the first cutout and the second cutout, the protrusion defines a blind hole along a direction perpendicular to the bottom surface, the fixing pole passes through the rotating plate and inserts into the blind hole.

3. The electronic device of claim 2, wherein the rotating plate defines a through hole and two mounting hole symmetrical with the through hole, the center of the through hole and the centers of the two mounting holes are arranged in one straight line, the first lens module and the second lens module respectively extend through the two mounting holes to be fixed on the rotating plate, the fixing pole passes through the through hole and inserts into the blind hole.

4. The electronic device in claim 3, wherein the first barrel comprises a hollow cylindrical first fixing portion, the second barrel comprises a hollow cylindrical second fixing portion, the first lens unit is mounted in the first fixing portion, an external diameter of the first fixing portion is substantially equal to an internal diameter of each mounting hole, the second lens unit is mounted in the second fixing portion, an external diameter of the second fixing portion is substantially equal to an internal diameter of each mounting hole, the first fixing portion and the second fixing portion are respectively engaged with the two mounting holes by an interference fit.

5. The electronic device in claim 3, wherein the fixing pole comprises a first portion and a second portion extending from the first portion, a diameter of the first portion is larger than that of the second portion and the through hole, the second portion extends through the through hole to engage with the blind hole, and thus the rotating plate is positioned between the protrusion and the second portion.

6. The electronic device in claim 5, wherein the protrusion is substantially oval in cross section.

7. The electronic device in claim 1, wherein the fixing pole defines a receiving groove for receiving a stylus.

* * * * *